United States Patent
O'Rourke et al.

(10) Patent No.: US 7,784,259 B2
(45) Date of Patent: Aug. 31, 2010

(54) MONOLITHIC ENCLOSED CABLE CARRIER

(75) Inventors: James D. O'Rourke, Pewaukee, WI (US); Jay R. O'Brien, Valparaiso, IN (US); Mark A. Zanolla, Hobart, IN (US)

(73) Assignee: A&A Manufacturing Co., Inc., New Berlin, WI (US)

( * ) Notice: Subject to any disclaimer, the term of this patent is extended or adjusted under 35 U.S.C. 154(b) by 763 days.

(21) Appl. No.: 10/586,278

(22) PCT Filed: Jan. 20, 2005

(86) PCT No.: PCT/US2005/002244

§ 371 (c)(1),
(2), (4) Date: May 29, 2007

(87) PCT Pub. No.: WO2005/071284

PCT Pub. Date: Aug. 4, 2005

(65) Prior Publication Data

US 2008/0217487 A1    Sep. 11, 2008

Related U.S. Application Data

(60) Provisional application No. 60/538,809, filed on Jan. 23, 2004.

(51) Int. Cl.
*F16L 11/18* (2006.01)
*H02G 3/04* (2006.01)

(52) U.S. Cl. .............................. 59/78.1; 59/900; 248/49; 138/110; 138/120; 138/165

(58) Field of Classification Search ............... 59/78, 59/78.1, 900; 248/49, 51; 138/110, 120, 138/165
See application file for complete search history.

(56) References Cited

U.S. PATENT DOCUMENTS

| | | | |
|---|---|---|---|
| 3,517,702 A * | 6/1970 | Trimble et al. | 138/128 |
| 4,406,379 A | 9/1983 | Anderson et al. | |
| 4,944,976 A * | 7/1990 | Plummer, III | 428/36.9 |
| 5,411,443 A | 5/1995 | Meier et al. | |
| 5,728,976 A | 3/1998 | Santucci et al. | |
| 5,905,231 A * | 5/1999 | Houte et al. | 174/68.3 |
| 6,012,683 A | 1/2000 | Howell | |
| 6,459,037 B2 | 10/2002 | Muller et al. | |
| 6,516,602 B2 | 2/2003 | Sakai et al. | |
| 6,708,480 B1 | 3/2004 | Wehler | |
| 7,418,812 B2 * | 9/2008 | Ikeda et al. | 59/78.1 |
| 7,559,340 B2 * | 7/2009 | Ikeda et al. | 248/49 |

OTHER PUBLICATIONS

International Search Report and Written Opinion Under Date of Mailing of Jun. 24, 2005, in connection with International Patent Application No. PCT/US2005/002244.

* cited by examiner

*Primary Examiner*—David B Jones
(74) *Attorney, Agent, or Firm*—Quarles & Brady LLP (57) ABSTRACT

A cable carrier (10) has top (18) and bottom (16) longitudinally continuous sides, with one side (18) more flexible and the opposite side (16) less flexible. The sides are made of continuous sheets of material to define a closed tubular shape in which energy carriers can be housed and supported. The sheets may be integral, or have integral parts, and can be extruded. The carrier may be longitudinally openable with a zipper structure (125) to permit loading of energy carriers.

27 Claims, 8 Drawing Sheets

MONOLITHIC ENCLOSED CABLE CARRIER

CROSS-REFERENCE TO RELATED APPLICATION

This claims the benefit of U.S. Provisional Patent Application No. 60/538,809 filed Jan. 23, 2004.

STATEMENT CONCERNING FEDERALLY SPONSORED RESEARCH OR DEVELOPMENT

Not applicable.

FIELD OF THE INVENTION

This invention relates to cable carriers, and in particular to self-supporting cable carriers.

BACKGROUND OF THE INVENTION

Cable carriers are well known in the industry and, although called cable carriers, carry flexible hoses, cables, wires, or any elongated energy transmission conduits that can bend around the U-bend of the cable carrier as it moves back and forth. As is well known, one end of the cable carrier is fixed, and the other end of the cable carrier is attached to a movable head of a machine, for example of a machine tool, with a U-bend of the cable carrier in between an upper self supporting straight run and a lower straight run of the carrier so that the relative length of the two runs varies as the movable end of the carrier moves linearly. To achieve this function, the cable carrier is self supporting in a generally straight configuration in one direction, but not the opposite direction.

U.S. Pat. Nos. 5,108,350, 5,184,454, and 6,107,565 disclose cable carriers made up of two parallel chains of side links interconnected end-to-end, which permit pivoting between the lengths in only one direction from a straight or slightly cambered extended position. The links may be molded with limiting members of various sizes to create carrier chains with a variety of pivot radii. Carrier chains of this type, made of multiple pieces which may be either made of plastic or metal or both, are well known.

Also known in the prior art are carriers with longitudinally continuous members, such as flat metal covers, or bands which may be concave in the lateral (width-wise) direction, like a wind-up tape measure tape. For example, Merker U.S. Pat. No. 3,161,205 discloses a longitudinally flexible band with cable supporting members thereon having rollers for movement along parallel rails which support and guide the carrier. Weber U.S. Pat. No. 3,330,105 reveals an enclosed cable carrier with cylindrical cross-lengths and lateral separators, through which is inserted a sheet metal band cover between separating web members and roller members which extend between the opposite side plates. Moritz U.S. Pat. No. 4,084,370 discloses another carrier using a sheet metal band as a cover.

Carriers with individual or continuous cross-links or covers fixed to the side plates require many parts, making manufacture, assembly, and disassembly more difficult. Carriers with individual or continuous covers, whether or not integrally molded with the side plates, can have pinch points, which also can permit dirt and debris to enter the carrier. Sheet metal band covers, whether flat or arched laterally, can have sharp edges which can abrade the cables and hoses, require an open joint at the sides, and can be difficult to handle in long sections. In addition, with such bands, separate cross-links are typically provided to hold the side chains in lateral and transverse alignment.

SUMMARY OF THE INVENTION

The invention provides a cable carrier having longitudinally continuous sides, in which one side is made of a more stiff material and the other side is a more flexible and soft material. The stiffer side supports the carrier in straight runs, but allows bending into a U-shaped configuration as is required in many cable carrier applications. The softer side encloses the interior space of the cable carrier, together with the stiffer side, and has sufficient flexibility to allow the cable carrier to bend into a U-shape. Preferably, the softer side is molded, for example, by extrusion, of an elastomeric material. The stiffer side can also be molded of a harder plastic material, and may include a metal band.

Substantial portions of the carrier, referred to as the carrier body, are preferably formed monolithically, i.e., in one piece. In one form, the body forms a longitudinally continuous sheath, having a first side joined integrally to a second side at at least one edge thereof, with the first side spaced from the second side, and may have a longitudinally releasable coupling in one of the sides or edges. The coupling may be released to place cables and hoses into the space between the first and second sides and then refastened to hold the cables and hoses inside the cable carrier body.

Preferably, at least the stiffer one of the sides has a laterally convex or arched profile and may be of a relatively hard and resilient material, at least in part, so as to help support the cable carrier in a straight position, but allow bending of the cable carrier around the normal U-bend, typically 180°, as is normal in cable carrier installations. When going around the U-bend of the cable carrier, this side tends to flatten out laterally, i.e., become less arched in the lateral direction, which tends to reduce the size of the space between the first and second sides. The second side should be made of a relatively more pliable and soft material which permits it to go around the U-bend of the cable carrier without excessively closing off the space between the first and second sides and to maintain that space around the enclosed cables and hoses.

The first and second sides can be integrally made of materials with different characteristics by a co-molding process, such as co-extrusion The first side can be made of a relatively hard and stiff material with the second side made of a softer and more flexible material, with the first and second sides joined at the first edge, or at both edges. The second edge of the second side and the second edge of the first side, or one of the sides, can be formed to have a longitudinally running tongue and groove type releasable "zipper" coupling. The softer material of the one side also forms a living hinge that allows the cable carrier to be easily loaded to permit loading energy carriers such as hoses and cables into it.

The ends of the cable carrier body must be attached to the machine to which the cable carrier is assembled, and to do that rigid end connectors are preferably provided which connect the ends of the cable carrier body to the machine to which it is installed. The end connectors may be fastened, for example with a snap connection to the more rigid first side and be fastenable with a snap connection or bolts to the machine.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
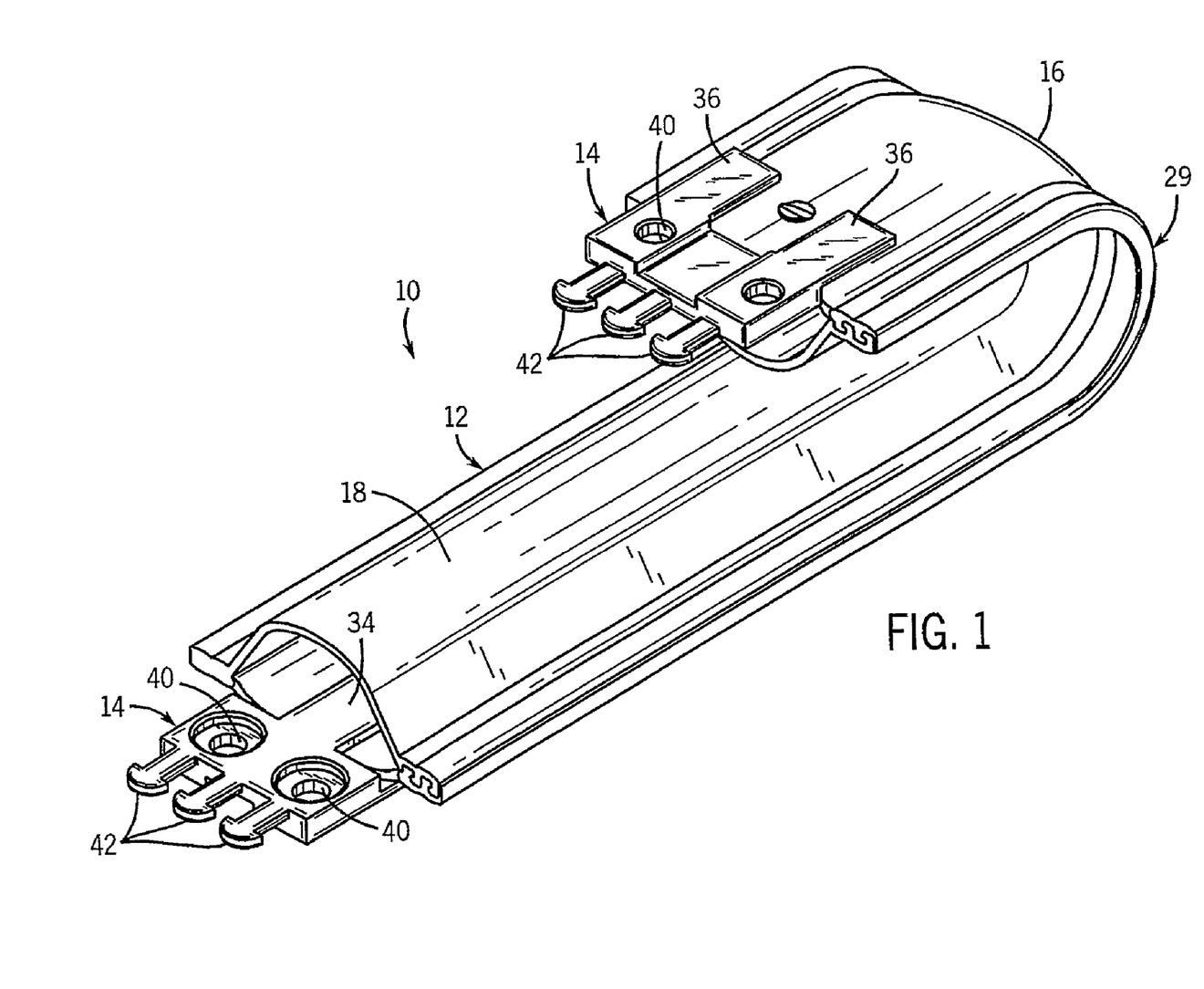
FIG. 1 is a perspective view of a cable carrier of the invention shown in a 180° U-bent configuration with a lower run and an upper run parallel to the lower run, as the cable carrier would be used in a typical installation.
Figure 2:
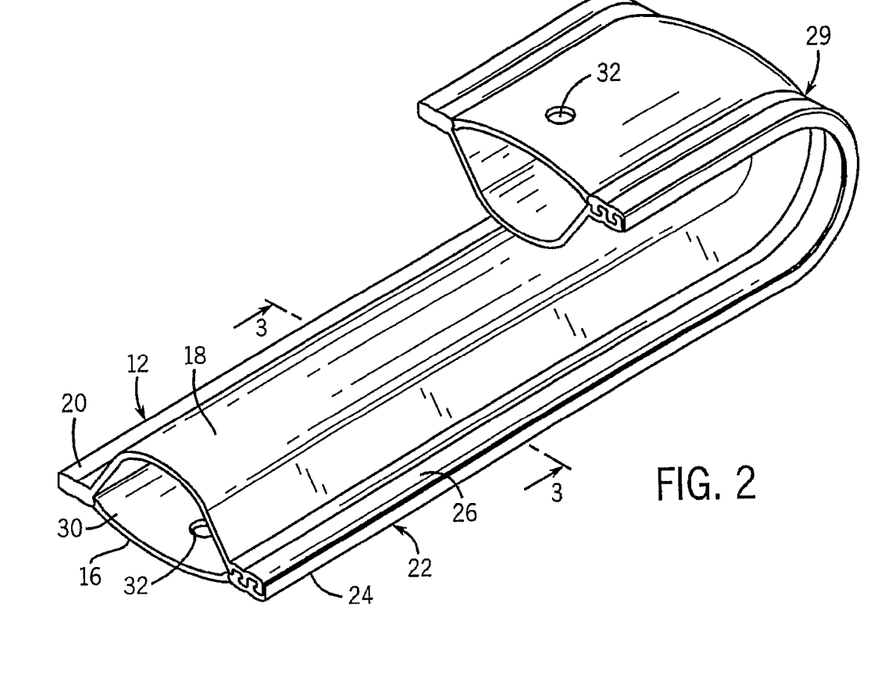
FIG. 2 is a view similar to FIG. 1, but without end connectors installed to the cable carrier body.
Figure 3:
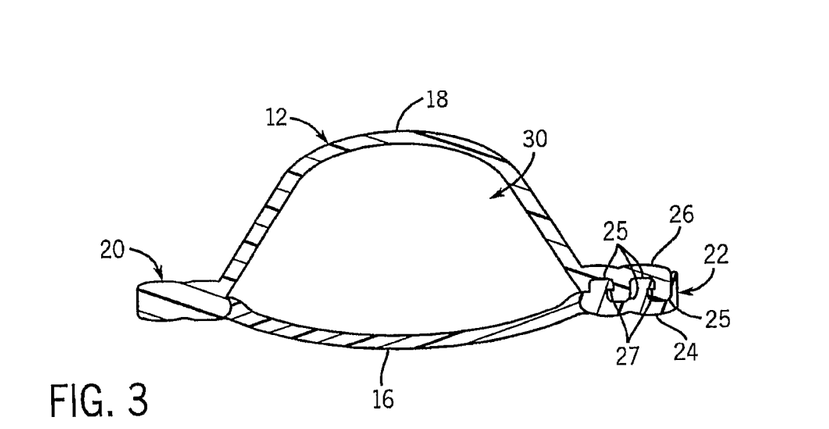
FIG. 3 is a cross-sectional view from the plane of the line 3-3 of FIG. 2.

FIG. 1 illustrates a cable carrier 10 of the invention including a carrier body 12 and two end connectors 14 attached to the body 12. Referring to FIGS. 2 and 3, the body 12 is formed in one piece, having a first side 16, a second side 18, a first edge 20 that is integral with the first and second sides 16 and 18, and a second edge 22 that is formed of a releasable connection between the free edge 24 of the first side 16 and the free edge 26 of the second side 18. Each of the free edges 24 and 26 form tongue and groove interlocking structures 25 having undercut shoulders 27 that interlock for the full length of the body 12 to provide a seal for the full length against dust, dirt, and moisture entry to the interior space 30 that is between the first and second sides 16 and 18.

In the preferred form as illustrated, the edge 22 is a zip lock-type seal, but any structure which is releasable and when engaged closes the interior 30 of the body 12 could be used. To load cables and hoses into the interior space 30, the free edges 24 and 26 are first released by pulling or zipping them apart, the cables and hoses are loaded into the space 30, and the edges 24 and 26 are then pressed or zipped (perhaps with a zipper) back together into mating engagement to seal the cables and hoses into the space 30.

The body 12 is preferably formed by a co-extrusion process using two different materials. The material of the central portion of the first side 16, the central portion being the portion that spans between the two edges 20 and 22, is a relatively hard and stiff, but still flexible, plastic material. For example, 0.05 inch thick rigid PVC is one such material. The central portion of the first side 16 is formed with a lateral arch that is concave toward the interior 30 as illustrated in FIGS. 2 and 3, which is similar to the arch in a wind-up type tape measure. The arch flattens out around a curve, for example, around the U-bend 29 of the carrier shown in FIG. 1, which tends to reduce the interior space 30. However, the arch 16 in the upper and lower straight sections (runs) of the carrier 10 helps to keep the carrier 10 from bending or sagging so as to support the cables and hoses. The central section of the first side 16 which is formed of the rigid PVC material is indicated in FIG. 3 by being blackened in color, with the remaining portions of the body 12 being lighter in color.

The remaining, softer and more pliable portions of the body 12, other than the central harder section of the side 16, are the first edge 20, the second side 18, and the free edges 24 and 26. These are made of a material which is relatively softer and more compliant than rigid PVC, such as an elastomer. Such a material may be, for example, urethane of approximately a hardness of 90 Shore A durometer. This material is soft in comparison to the rigid PVC so as to be able to flex and stretch when the cable carrier is bent by 180° as illustrated in FIGS. 1 and 2. It can also flex sufficiently to provide a living hinge at the first edge 20 and to allow the tongue and groove structures of the free edges 24 and 26 to flex sufficiently so as to be engaged and disengaged repeatedly. A typical thickness for the portion of second side 18 that spans between the first and second edge, over the space 30, would be 0.03 inches.

Figure 4:
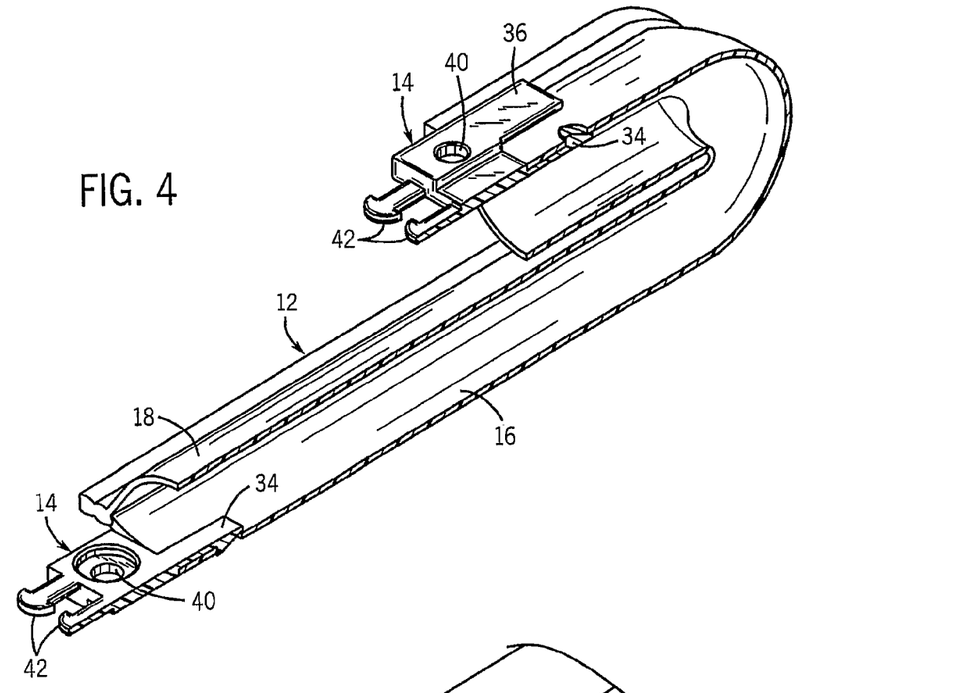
FIG. 4 is longitudinal cross-sectional view of the cable carrier of FIG. 1.
Figure 5:
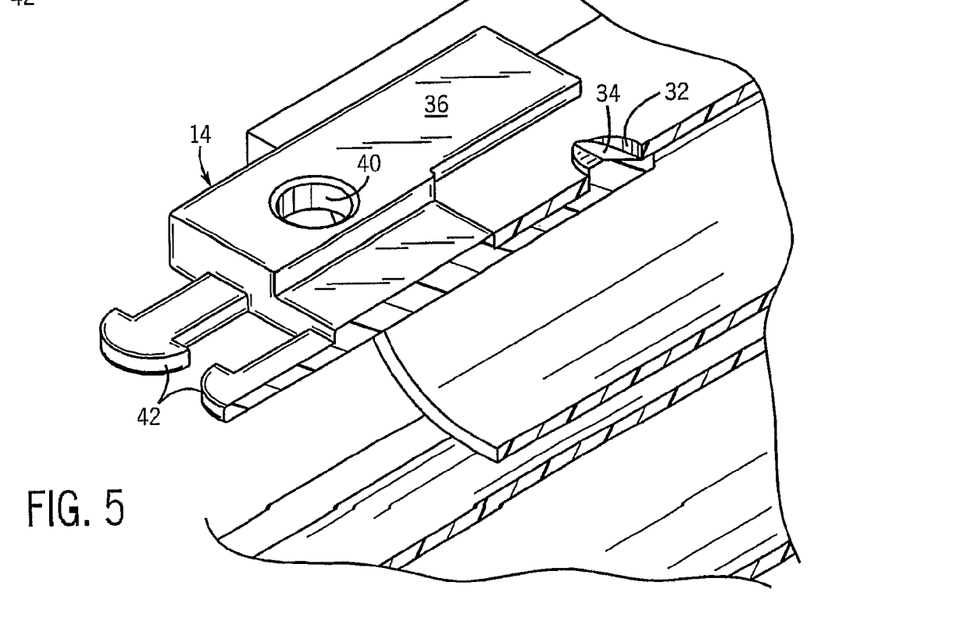
FIG. 5 is a detail view of the end area of the cable carrier of FIG. 4.

Referring to FIGS. 4 and 5, the end connectors 14 are preferably made of a very strong and hard material, such as molded nylon, which can also be fiber reinforced. A hole 32 is formed in each end of the body 12, preferably in the first side 16, which is harder than the second side 18, and a resilient tab 34 of the connector 14 is snapped into the hole 32 from the inside of the carrier to hold the connector 14 onto the end of the body 12. Side fingers 36 of the connector 14 extend on the outside of the first side 16 to hold the first side 16 against the tab 34, and maintain the engagement of the tab 34 in the hole 32. Holes 40 are formed in each connector 14 for bolting the connector 14 to the machine to which the carrier 10 is to be assembled, and extensions 42 extend from the end of each connector 14 to provide a place to wrap cable ties around to secure and route the cables and hoses which run through the carrier 10.

Additional embodiments of the invention will now be described. In each additional embodiment, elements corresponding to the elements in the first embodiment 10 are labeled with the same reference number plus a multiple of 100, for example, 100, 200, 300, etc.

Figure 6:
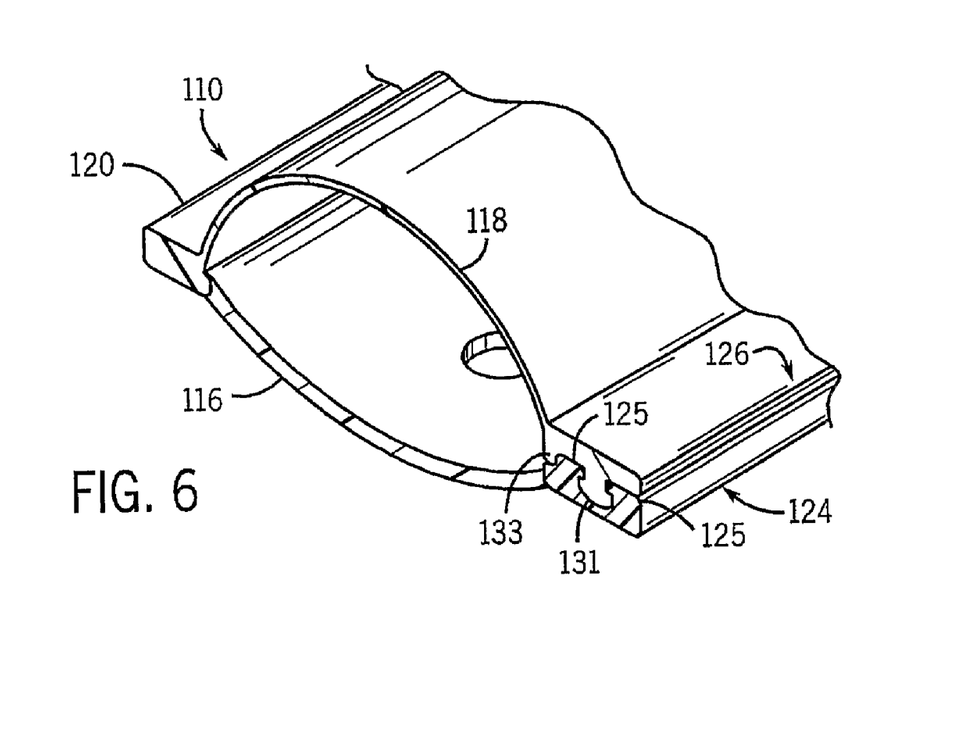
FIGS. 6-15 illustrate alternative embodiments of the invention.

FIG. 6 illustrates a second embodiment 110. The cable carrier 110 is essentially the same as cable carrier 10 except that the edge connection of edge 124 to edge 126 is somewhat different, having a double "zipper" with interlocking structures 125 facing each other with a double interlocking structure 131 between them having shoulders defined on opposite sides of it. In FIG. 6, the dark portions are rigid PVC and the lighter portions are an elastomer such as Santoprene™, a thermoplastic elastomer that is commercially available from Advanced Elastomer Systems L.P., Akron, Ohio, similar to the embodiment 10, with the one side 116 relatively stiff and hard, the other side 118 relatively flexible and soft, and the side edges 120, 124, and 126 relatively soft and flexible. The edge 126 also has a lip 133 that runs longitudinally continuously that helps support the inner zipper structure 125.

Figure 7:
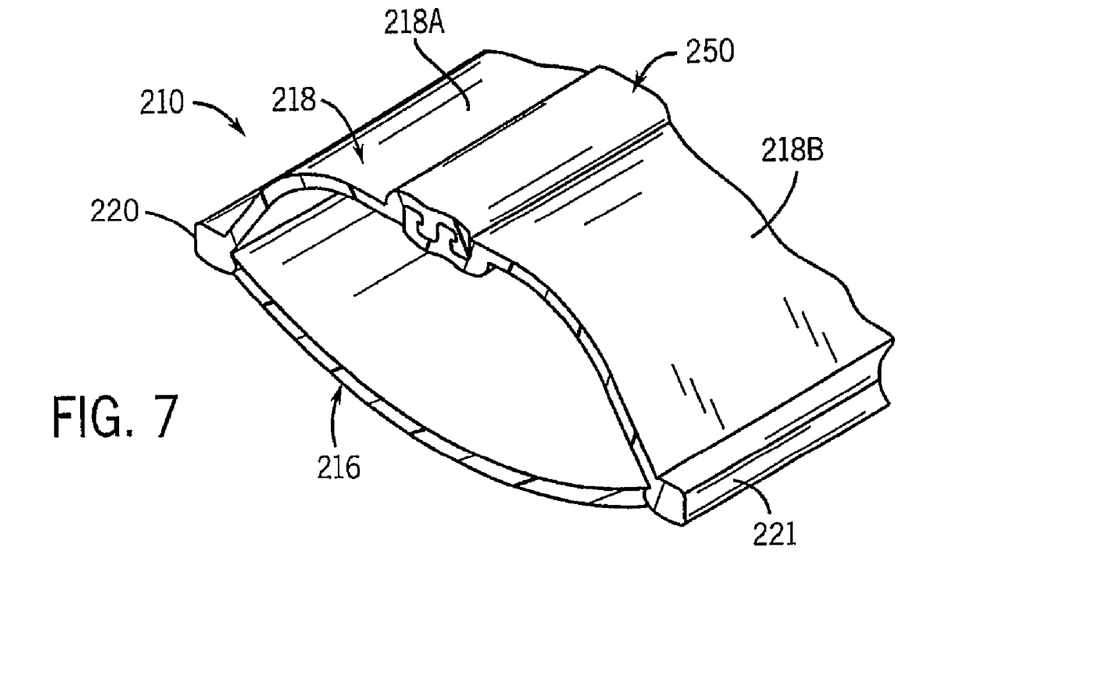

FIG. 7 illustrates a third cable carrier embodiment 210. In the cable carrier 210, the two sides 116, 118 are integral at both side edges 220, 221, and the side 218 is separable longitudinally down the middle, being made in two sections 218A and 218B. A double zipper connection 250 joins the two sections 218A and 218B longitudinally continuously down the middle with a zipper connection similar to the zipper connection of the first embodiment 10. In the cable carrier 210, the side 218 and the side edges 220 and 221 are the softer, more flexible Santoprene™ material and only the side 216 between the side edges 220 and 221 is the more stiff rigid PVC material.

Figure 8:
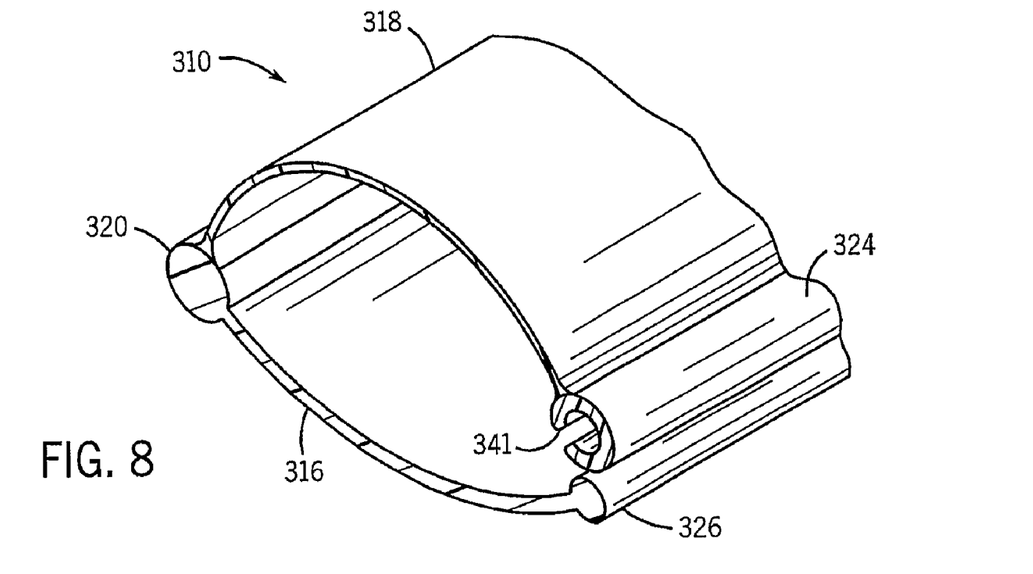

FIG. 8 illustrates a fourth embodiment 310 that is essentially the same as the first embodiment 10, except for the edge structures 320, 324, and 326. In the cable carrier 310, the first and the second sides are integral at edge 320 which is solid cylindrical shaped and rigid PVC. Edge 324 is also rigid PVC, but it is hollow, tubular shaped and slotted at 341 to permit releasable entry of solid cylindrical shaped edge 326 in a longitudinally continuous releasable connection. Edge 326 is also the rigid PVC material. In this embodiment, only the side 318 between the edges 320 and 324 is the relatively more flexible and soft elastomeric Santoprene™ material. Alternatively, a concave metal band could be incorporated into the side 316 of carrier 310 like the band 616A in FIG. 11, described below.

Figure 9:
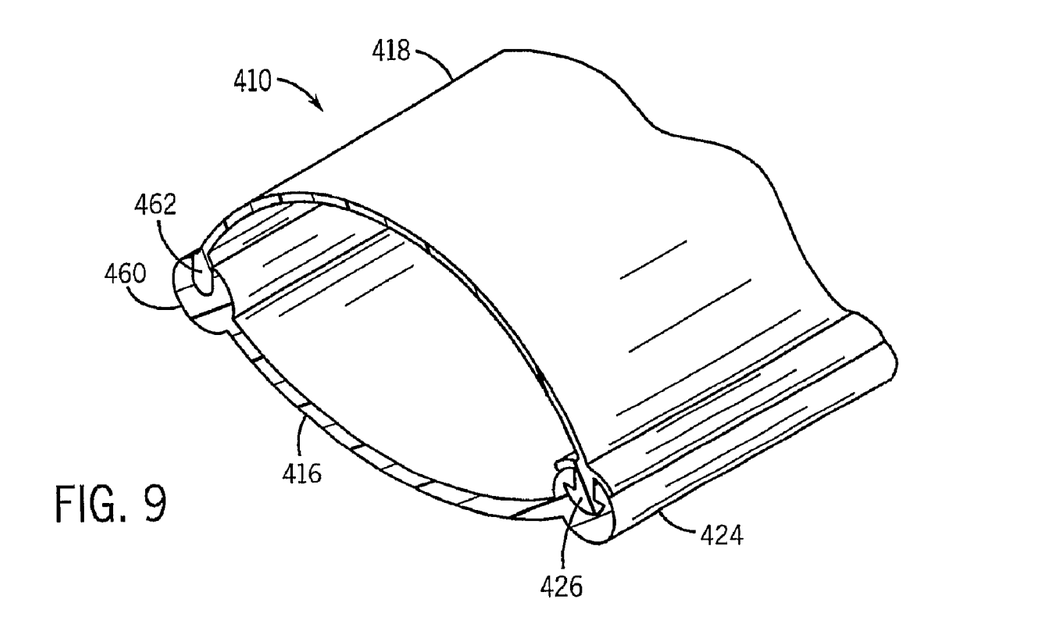

FIG. 9 illustrates another embodiment 410 that is similar to the embodiment 310 in that it has generally cylindrical side edges, except that both sides are separable. Rigid PVC material makes up the whole side 416 and the generally cylindrical female side edges 460, 424 that have mating openings to receive the male side edges 462, 426 of the cover side 418. The cover side 418 including the male projections 462 and 426 is made of the relatively soft and flexible elastomeric material, for example, Santoprene™. In this embodiment, the two sides 416 and 418 can be extruded together, with the side edges 460, 462 separable or not and the side edges 424, 426 separable or not, but in any case, at least one of the pairs of side edges 460, 462 or 424,426 must be separable to enable loading of energy carriers, such as cables or hoses, into the interior space of the cable carrier 410.

Figure 10:
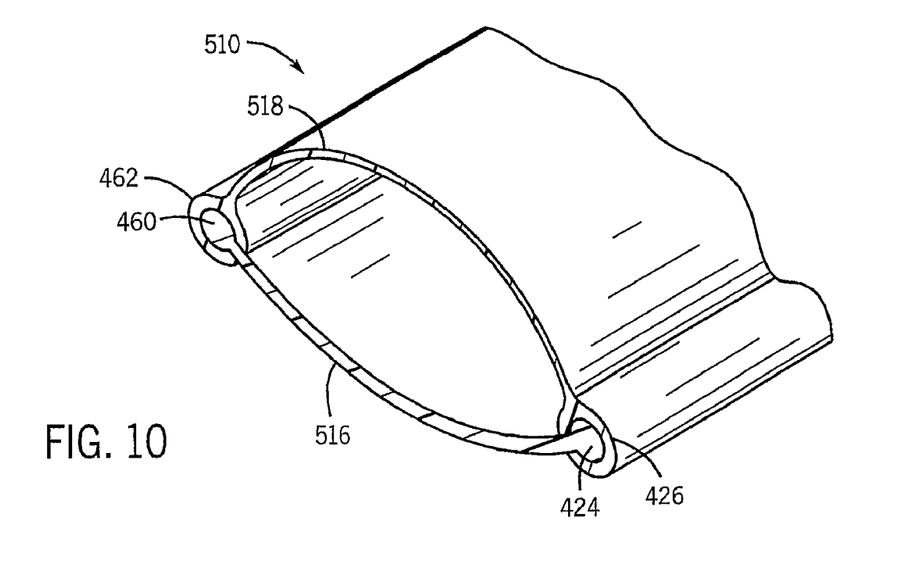

FIG. 10 illustrates another embodiment 510 that is essentially the same as the embodiment 410, except for the side edge connections. In the embodiment 510, both side edges are generally cylindrical and preferably separable, with slotted tubular (female) side edges 462, 426 integral with side 518, and the solid cylindrical side edges 460, 424 integral with the side 516. In the embodiment 510, only the side 518 is made of the relatively soft and more flexible elastomeric material, and the slotted tubular side edges 462 and 426 are made of the stiffer and harder material, for example, rigid PVC. The solid cylindrical edges 460, 424 and also the side 516 are also made of the stiffer and harder material. In this embodiment, the side 518 and edges 462, 426 and the side 516 and integral edge 460, 424 can be extruded together so that the two sides 518 and 516 are connected to one another coming off of the extruder, with the cable carrier 510 in a closed configuration.

Figure 11:
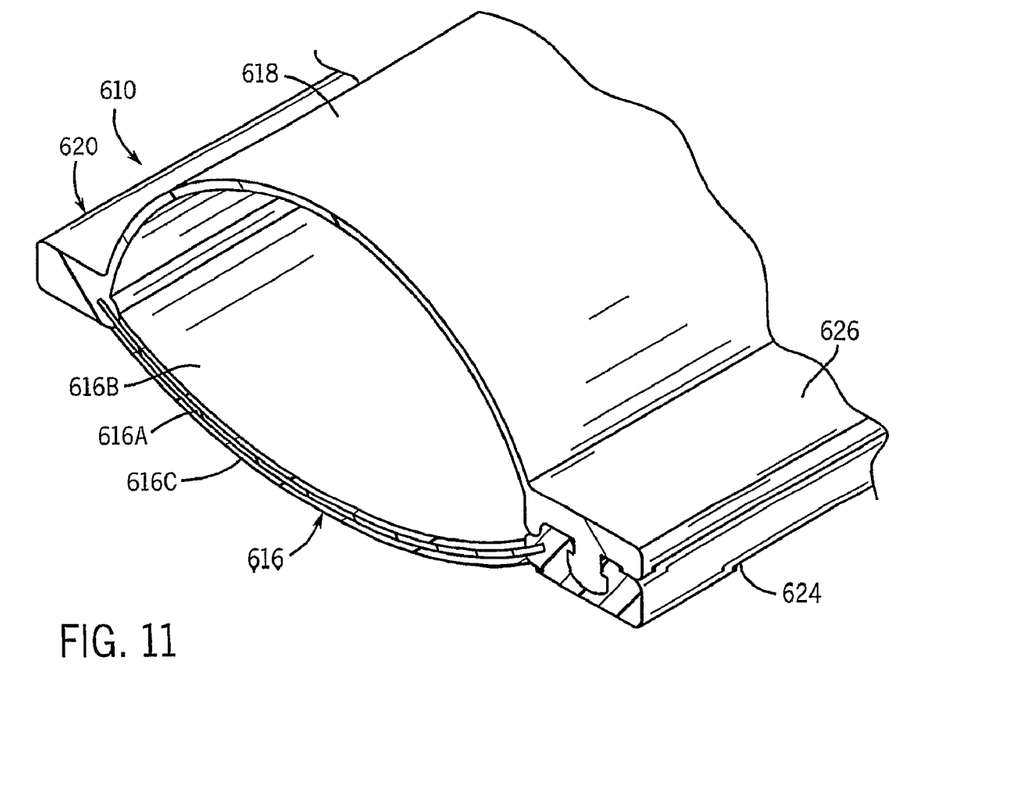

FIG. 11 illustrates cable carrier embodiment 610 which has an edge connection like the edge connection of the embodiment 110 except that in the embodiment 610 both edges are the relatively stiffer and harder material, for example, rigid PVC. The only part of the embodiment 610 that is the relatively softer and more flexible material is the side 618 between the edges 620 and 626. The embodiment 610 also differs from the embodiment 110 in that the side 616 is made of a composite of a 0.01 thick spring steel band 616A that is sandwiched on its opposite faces and laminated to two 0.01 thick coating layers of PVC 616B and 616C. The two coating layers 616B and 616C are referred to collectively as a plastic component herein. The composite side 616 is laterally concave toward the interior space defined within the cable carrier 616, as in all the prior embodiments described herein, and as is the side 618. A concave metal band like the band 616A could be incorporated into any of the embodiments described above.

Figure 12:
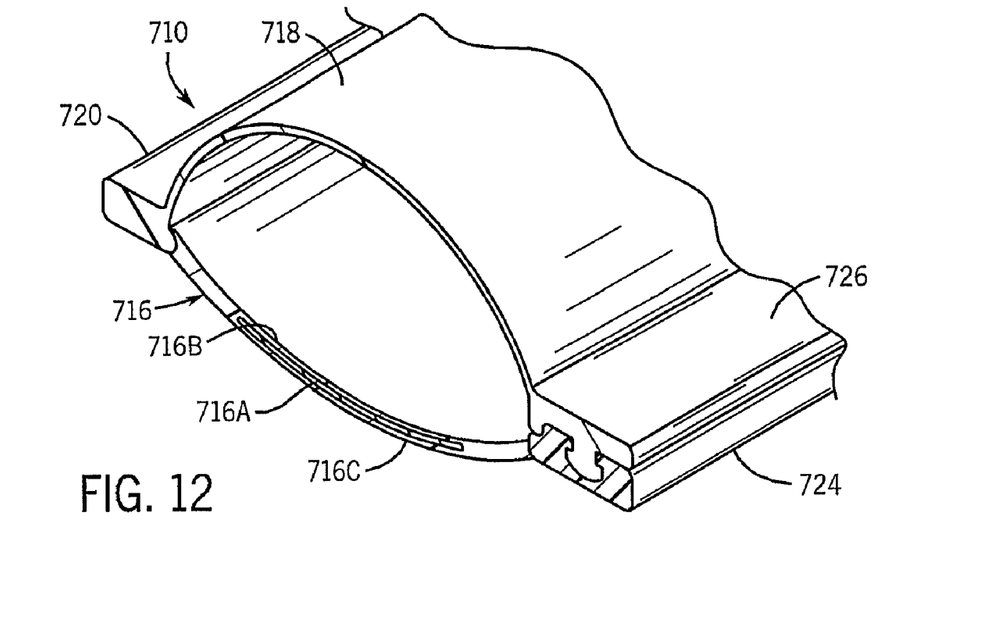

The cable carrier embodiment 710 of FIG. 12 differs from the embodiment 610 in that the 0.01 thick spring steel band 716A is of a reduced width, but still has coatings of rigid PVC 716B and 716C laminated to both sides of it. The plastic portions of side 716 and edge 724 are the relatively more rigid and stiff material, and the edges 720, 726, and side 718 are the relatively softer and more flexible material, such as Santoprene™. In the embodiment 710, the relatively stiffer material could be, for example, rigid PVC. Again, in the embodiment 710, the steel band 716A along with the side 716 and the side 718 are laterally concave toward the interior space of the cable carrier.

Figure 13:
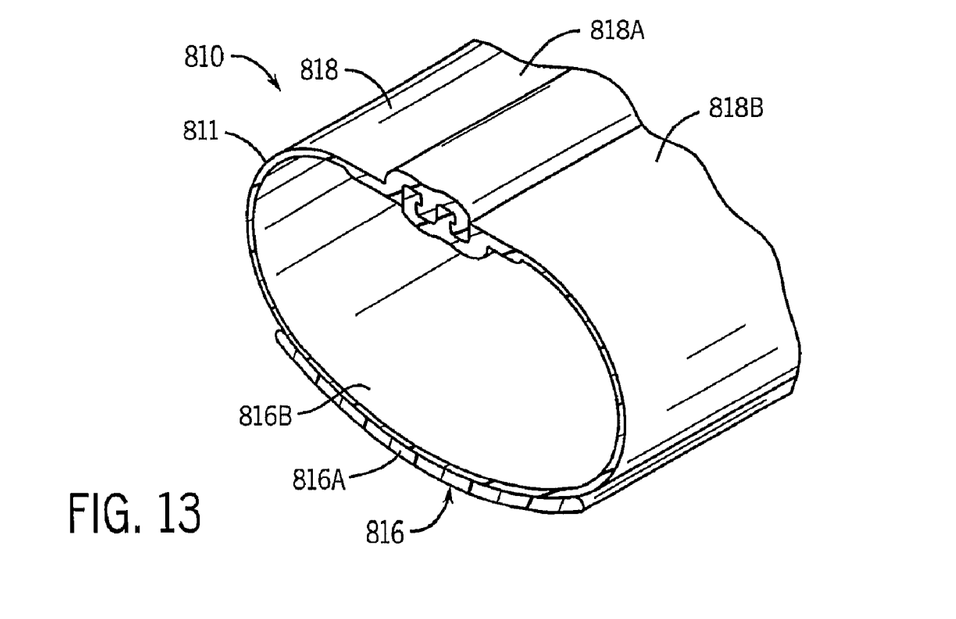

Referring to FIG. 13, the cable carrier embodiment 810 lacks discrete side edges that extend laterally from the sides of the cable carrier, but has rounded side edges between the upper and lower sides, at the opposite lateral sides of the cable carrier. The cable carrier 810 is of an elongated circular cross-section, with a releasable connection in the middle at the top, similar to the embodiment 210. In the cable carrier 810, the entire plastic body 811 is the relatively softer and more flexible material, for example, elastomeric material like Santoprene™. To stiffen the body 811, a 0.01 inch thick spring steel band that is laterally concave toward the interior space of the cable carrier 810 is laminated by adhesive or otherwise affixed to the side 816B on the outside of the body 811.

Figure 14:
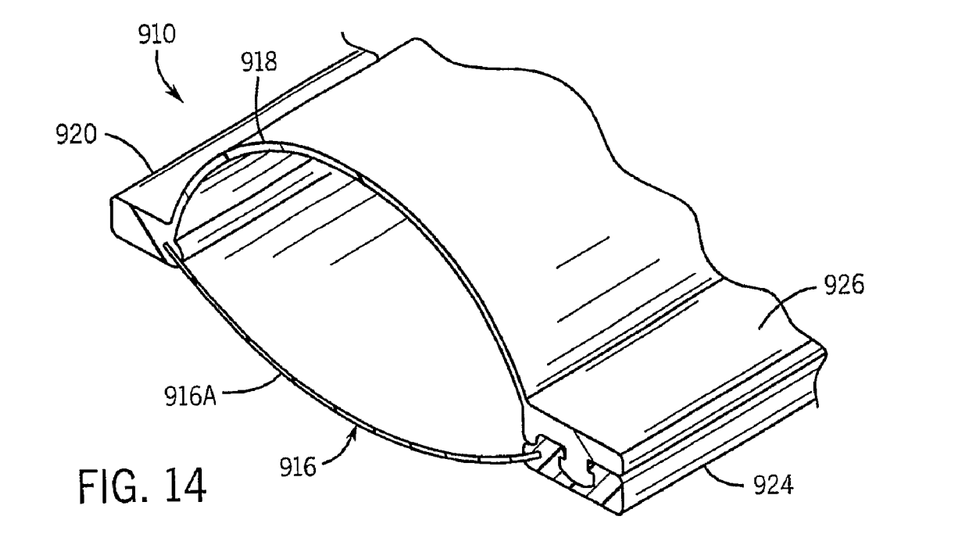

Referring to FIG. 14, the cable carrier embodiment 910 is similar to the embodiment 610, except that side 616 has no plastic coatings on the opposite sides of the 0.01 thick spring steel band 916A. In the embodiment 910, only the side 918 is the relatively softer and more flexible elastomeric material, for example, Santoprene™, and the edges 920, 926 and 924 are all the relatively stiffer plastic material, for example, rigid PVC. The side edges of the band 916A are permanently affixed to the opposite side edges 920, 924, for example, by being fit into them as they are extruded, by adhesive or by any other suitable means of attachment.

Figure 15:
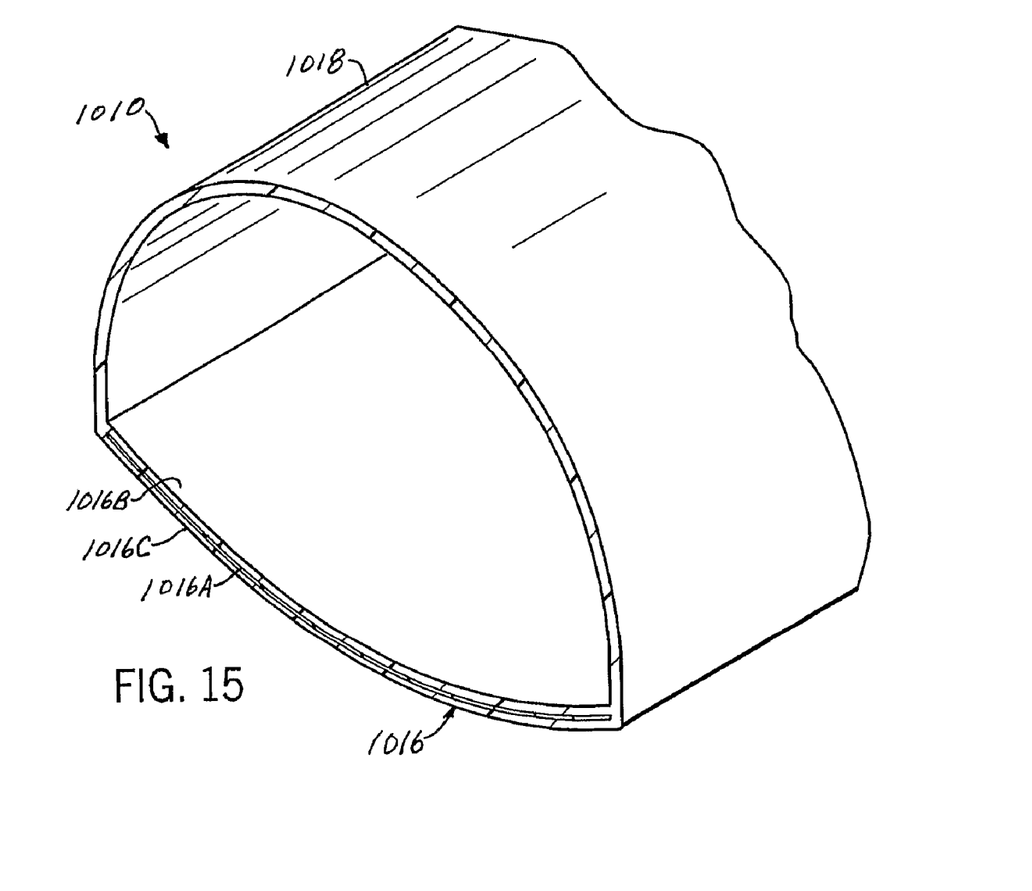

Referring to FIG. 15, the cable carrier embodiment 1010 is similar to the embodiment 610, except that the carrier 1010 it is not openable and has no flange type edges like 620, 624, 626 of embodiment 610. In the embodiment 1010, all of the plastic is the relatively softer and more flexible elastomeric material, for example, Santoprene™. It is possible, however, that a harder plastic could be used for parts of the carrier 1010 if additional rigidity is required or less flexibility is needed. The embodiment 1010 has laterally concave (when straight) side 1016 that is made of a composite of a 0.01 thick spring steel band 1016A that is sandwiched on its opposite faces and laminated to two 0.01 thick coating layers of soft plastic 1016B and 1016C, but may alternatively be a more stiff PVC or other plastic material. The composite side 1016 is laterally concave toward the interior space defined within the cable carrier 1016, as in all the prior embodiments described herein, and as is the side 1018.

The end connections of FIGS. 1, 4, and 5 can be used with any of the preceding embodiments. Also, all of the embodiments described herein can be made by a co-extrusion process.

A preferred embodiment of the invention has been described in considerable detail. Many modifications and variations to the preferred embodiments described will be apparent to persons of ordinary skill in the art, which will still be within the spirit of the invention. Therefore, the invention should not be limited to the preferred embodiments described, but should be defined by the claims which follow.

We claim:

1. A cable carrier for supporting one or more cables or hoses in a U-shaped configuration comprising:
    a monolithic body having a first side, a second side opposite from and spaced from the first side, a first edge which is integral with the first and second sides, and a second edge opposite from the first edge, the second edge including a free edge of the first side that is integral with the first side and a free edge of the second side that is integral with the second side, the free edge of the first side being releasably connectable to the free edge of the second side;
    wherein the first side of the cable carrier has a central section of a hardness which is greater than the hardness of the second side.

2. A cable carrier as claimed in claim 1, wherein the free edge of the first side has a hardness which is less than the hardness of the central section of the first side.

3. A cable carrier for supporting one or more cables or hoses in a U-shaped configuration comprising:

a monolithic body having a first side, a second side opposite from and spaced from the first side, a first edge which is integral with the first and second sides, and a second edge opposite from the first edge, the second edge including a free edge of the first side that is integral with the first side and a free edge of the second side that is integral with the second side, the free edge of the first side being releasably connectable to the free edge of the second side; and end connectors attached to ends of the cable carrier for connecting the cable carrier to a machine to and from which cables or hoses housed within the cable carrier are routed.

4. A cable carrier for supporting one or more cables or hoses in a U-shaped configuration comprising:

a monolithic body having a first side, a second side opposite from and spaced from the first side, a first edge which is integral with the first and second sides, and a second edge opposite from the first edge, the second edge including a free edge of the first side that is integral with the first side and a free edge of the second side that is integral with the second side, the free edge of the first side being releasably connectable to the free edge of the second side;

wherein the cable carrier is co-extruded.

5. A cable carrier as claimed in claim 4, wherein one of the materials of the cable carrier is urethane.

6. A cable carrier as claimed in claim 5, wherein another of the materials of the cable carrier is PVC.

7. A cable carrier for supporting one or more cables or hoses in a U-shaped configuration comprising:

a monolithic body having a first side, a second side opposite from and spaced from the first side, a first edge which is integral with the first and second sides, and a second edge opposite from the first edge, the second edge including a free edge of the first side that is integral with the first side and a free edge of the second side that is integral with the second side, the free edge of the first side being releasably connectable to the free edge of the second side;

wherein the cable carrier is formed of materials of at least two different hardnesses.

8. A cable carrier as claimed in claim 7, wherein end connectors are connected to the material that is harder.

9. A cable carrier as claimed in claim 7, wherein said one of said sides that is arched has a section of a higher hardness than said other of said sides.

10. A cable carrier as claimed in claim 9, wherein said one of said sides that is arched has at least one edge that is softer than said section of a higher hardness.

11. A cable carrier as claimed in claim 10, wherein said one of said sides that is arched has two opposite edges that are softer than said section of a higher hardness.

12. A cable carrier for supporting one or more cables or hoses in a U-shaped configuration comprising a closed elongated tubular body having at least two sides opposed from one another with an interior space between them in which said cables or hoses are received, each side having opposed edges, wherein the edges of one side are joined with the edges of the other side along opposed side edges of the cable carrier, wherein one side is stiffer longitudinally than the other and the other side is more flexible than the one side.

13. A cable carrier as claimed in claim 12, wherein the one side is laterally concave facing the interior space of the cable carrier, and the lateral concavity flattens when the cable carrier is bent in a U-shape in the area of the bend.

14. A cable carrier as claimed in claim 12, wherein the two sides are integral with one another.

15. A cable carrier as claimed in claim 12, wherein the one side is reinforced with a metal band.

16. A cable carrier as claimed in claim 12, wherein along at least one side edge of the cable carrier, the edges of the two sides of the cable carrier are integral with one another.

17. A cable carrier as claimed in claim 12, wherein each of the two sides is a separate strip, and the side edges of the two sides are separably connected.

18. A cable carrier as claimed in claim 12, wherein the one side is a relatively rigid plastic, and the other side is an elastomer.

19. A cable carrier as claimed in claim 12, wherein the one side includes a metal band and a plastic component fixed to the metal band.

20. A cable carrier as claimed in claim 19, wherein the metal band is on the outside of the plastic component.

21. A cable carrier as claimed in claim 19, wherein the metal band is sandwiched by two layers of the plastic component.

22. A cable carrier as claimed in claim 12, wherein the one side is a metal band and the other side is plastic.

23. A cable carrier as claimed in claim 22, wherein the metal band is concave laterally.

24. A cable carrier as claimed in claim 12, wherein along both side edges of the cable carrier, the edges of the two sides are integral with one another.

25. A cable carrier as claimed in claim 24, wherein at least one of the two sides is openable longitudinally with a releasable connection.

26. A cable carrier as claimed in claim 25, wherein the side that is openable is the more flexible side.

27. A cable carrier as claimed in claim 12, wherein each side is a continuous sheet of material.

* * * * *